(12) United States Patent
Chang et al.

(10) Patent No.: US 7,630,101 B2
(45) Date of Patent: Dec. 8, 2009

(54) STRUCTURE OF A SCANNING WINDOW

(75) Inventors: Yuing Chang, Hsinchu (TW); Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 686 days.

(21) Appl. No.: 11/118,939

(22) Filed: Apr. 29, 2005

(65) Prior Publication Data

US 2005/0243383 A1 Nov. 3, 2005

(30) Foreign Application Priority Data

Apr. 30, 2004 (TW) .............................. 93206786 U

(51) Int. Cl.
*H04N 1/04* (2006.01)
*G03G 15/20* (2006.01)

(52) U.S. Cl. ...................................... 358/474; 358/506

(58) Field of Classification Search ................ 358/474, 358/494, 496, 497; 355/81, 82, 84, 120, 355/128, 129, 131; 101/41, 57, 68, 69; 347/220
See application file for complete search history.

(56) References Cited

U.S. PATENT DOCUMENTS

| 4,314,281 A | * | 2/1982 | Wiggins et al. | ............. | 358/406 |
| 4,566,325 A | * | 1/1986 | Rante | ......................... | 73/432.1 |
| 5,784,214 A | * | 7/1998 | Peng | ........................... | 359/808 |
| 2002/0181030 A1 | * | 12/2002 | Khovaylo et al. | ............ | 358/494 |
| 2006/0209277 A1 | * | 9/2006 | Whitney | ...................... | 355/52 |

* cited by examiner

*Primary Examiner*—Gabriel I Garcia

(57) ABSTRACT

A structure of a scanning window of an image scanning device has a housing, a transparent platen, a plurality of bases and a plurality of supporting blocks. The bases are formed on the inner walls of the housing. The supporting blocks are disposed on the bases and each supporting block has a supporting part. The transparent platen is disposed between the top portion of the housing and the supporting parts. Thus, the transparent platen is fixed in place by the supporting parts and the top portion of the image scanning device.

10 Claims, 5 Drawing Sheets

STRUCTURE OF A SCANNING WINDOW

BACKGROUND OF THE INVENTION

1. Field of the Invention

The present invention relates generally to a scanning window, and more particularly to an assembly structure for a glass disposing on the top of an image scanning device. A sheet is put on the glass and scanned by a carriage module. The image scanning device could be a flatbed scanner or a sheet-fed scanner. The structure is used to support the glass so that it can be fixed in the housing of the image scanning device.

2. Description of the Prior Art

An image scanning device of prior art includes a housing, a glass, and a carriage module. Since the glass is disposed in the housing and adjacent to the top thereof, an appropriate support is required for the positioning of the glass. A carriage module is disposed in the housing and capable of reciprocating motion to acquire images of a sheet to be scanned and perform image processing operations.

As FIG. 1 shows, the image scanning device has a plurality of mounting bases 12 (only one mounting base is shown in the figure) at the bottom of the housing 10 with a support 14 inserted in the mounting base 12. A glass 18 is positioned between the lower surface of the top surface 102 of the housing 10 and the top surface 16 of the support 14. Since the distance between the mounting base 12 and the top surface of the housing 10 is lengthy, the structural strength of the upper housing of the housing 10 is relatively weak. Moreover, when the housing 10 is molded, the cooling water for cooling down the mold tends to be constrained and consequently longer cooling cycles are required to avoid deformation.

Though screw nuts (not shown in the figure) can be embedded in the mounting base 12 for fixing the support 14 to the mounting base 12, extra costs are required for parts and thermal operations to embed the nuts in the mounting base 12.

In addition to the mounting base 12, the carriage module (not shown in the figure) in reciprocating motion is disposed at the bottom of the housing 10. With this structure, the housing 10 must have relatively greater length and width to prevent collision of the mounting base 12 and the carriage module in motion.

FIG. 2 shows another supporting device with a plurality of supports 20 (only one is shown in the figure) screwed beneath the top surface 102 of the housing 10. A height difference exists between one end of the support 20 and the top surface 102, and the glass 18 is positioned by embedding each side thereof in the gap formed due to the height difference.

However, since a support 20 is screwed to the top surface 102, the strength of the top surface 102 may be affected by screwing the support 20 and, in turn, the support 20 may not be well fixed in the position and the capability thereof to support the glass 18 is affected. Moreover, since the support 20 is screwed to the side of the top surface 102, the top surface 102 and the entire housing 10 must have the greater length and width to provide more space for screwing the support 20.

BRIEF SUMMARY OF THE INVENTION

One embodiment of the prior art has shortcomings such as complicated bottom structure of the housing, difficulty in the design of cooling water paths for molds, and long cooling cycles. Another embodiment of the prior art may weaken the structural strength of the top surface and, thus, affect the capability of the support to positioning the glass. The present invention provides an innovative structure which has a simpler mold design and smaller in dimension than the prior art embodiments and makes it easier in the assembly of the scanning window with better positioning.

The objective of the present invention is to provide a structure of a scanning window. A plurality of supports is disposed in the housing of an image scanning device. The support comprises a base disposed close to the top surface of the housing, and a supporting block disposed on the base to support the glass.

The base is used as a connection for the upper and lower housings of the housing when the upper and lower housings are assembled. The base is formed at the cut-off end of the strengthening structure on the inner wall of the housing. The design of the mold for forming the housing is also simplified with this structure. The combination of the base and the supporting block is capable of supporting the glass more rigidly and providing a more effective positioning for the glass. Moreover, the base and the supporting block are disposed away from the lower housing and do not collide with the carriage module. The size of the housing is, thus, reduced.

DETAILED DESCRIPTION OF THE INVENTION

Figure 1:
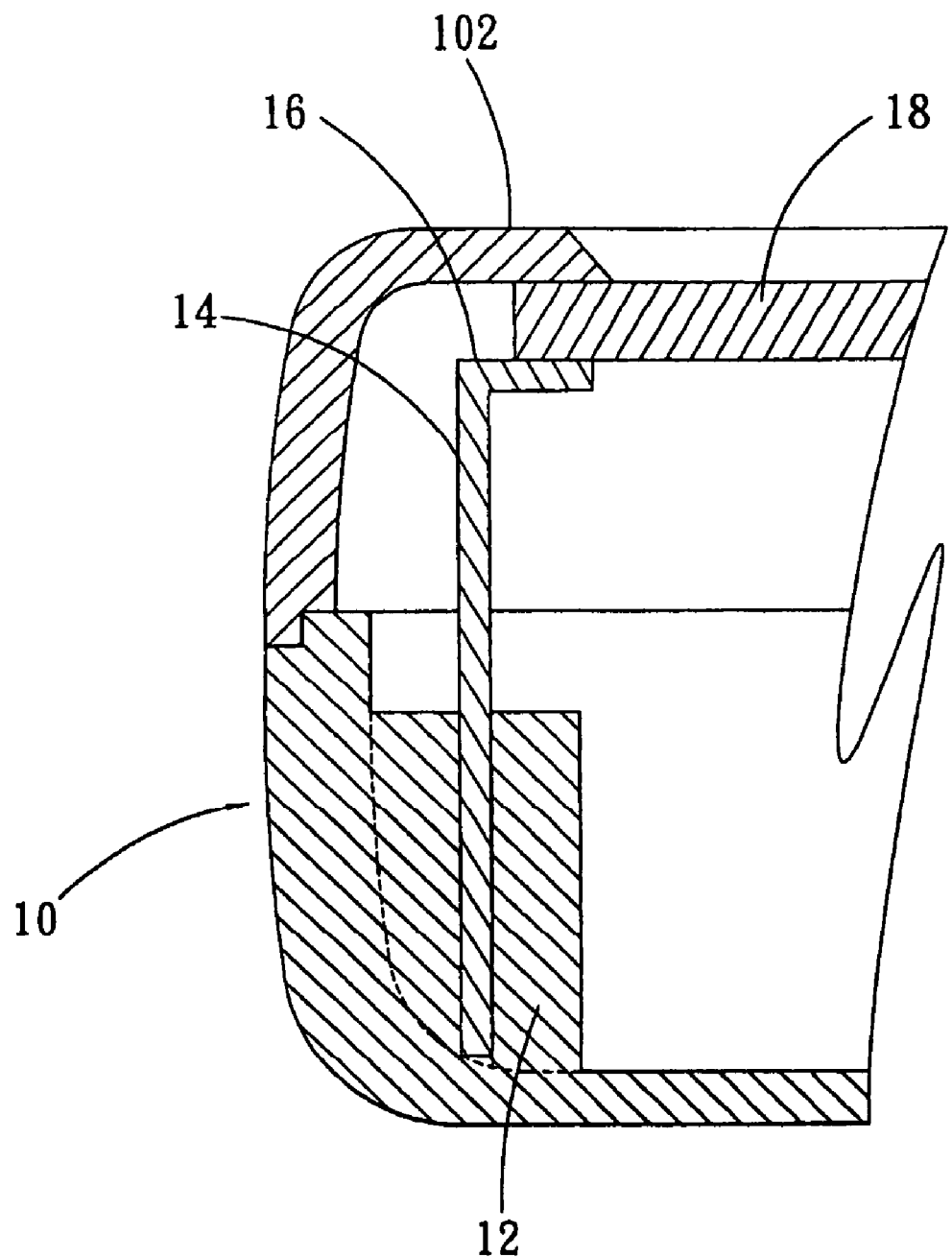
FIG. 1 is a schematic view of a structure of a prior art.
Figure 2:
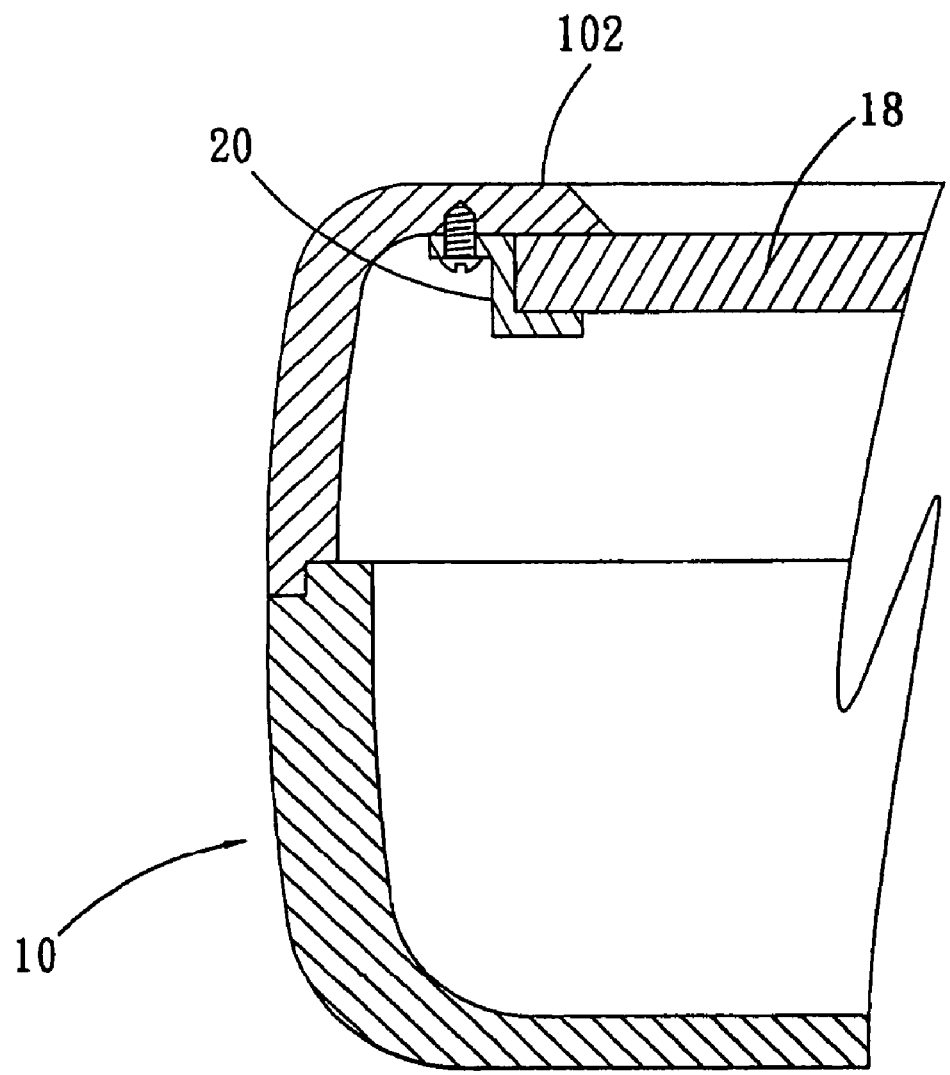
FIG. 2 is a schematic view of a structure of another prior art.
Figure 3:
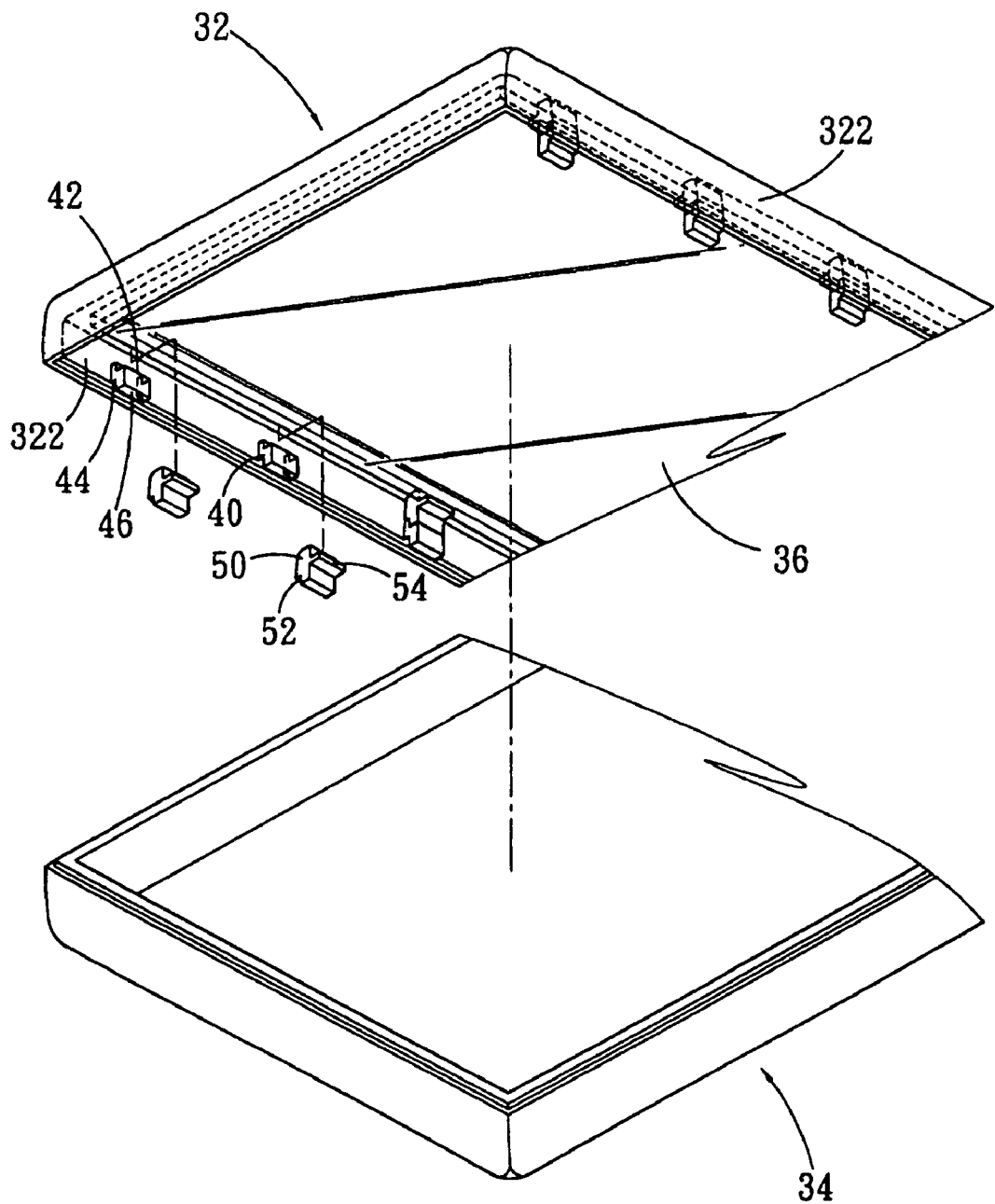
FIG. 3 is an exploded view of the present invention.

As shown in FIG. 3, an image scanning device comprises an upper housing 32 and a lower housing 34. The lower housing 34 is formed as a container for a carriage module (not shown in the figure) which moves in reciprocating motion. The upper housing 32 is formed as a frame with an opening 326 in the middle. A glass (transparent platen) 36 is disposed adjacent to the opening 326 in the upper housing 32. The housing of the image scanning device is formed when the upper housing 32 and the lower housing 34 hasp with each other.

A plurality of bases 40 is disposed on the inner side of the vertical part 322 of the upper housing 32. One end of the base 40 is formed to be an engagement part 42 that has a stepped structure and is positioned corresponding to the top portion 324 of the upper housing 32. Another end of the base 40 is formed to be another engagement part 44 with a stepped structure and an opening 46 is formed on one side thereof.

The upper housing 32 has a strengthening structure (not shown in the figure) for hasping the lower housing 34. Each of the bases 40 is formed with the strengthening structure. In detail, the base 40 is formed at the middle section of the strengthening structure close to the glass 36, where the middle section is formed void when being molded via the design of the angular pin of the mold.

An engagement part 52 with a stepped structure is formed at one end of a plurality of supporting blocks 50 each mounted on each of the bases 40. The supporting block 50 has a supporting part 54 on one side and a height difference exists between the top surface of the supporting part 54' and the top surface of the supporting block 50.

Figure 4:
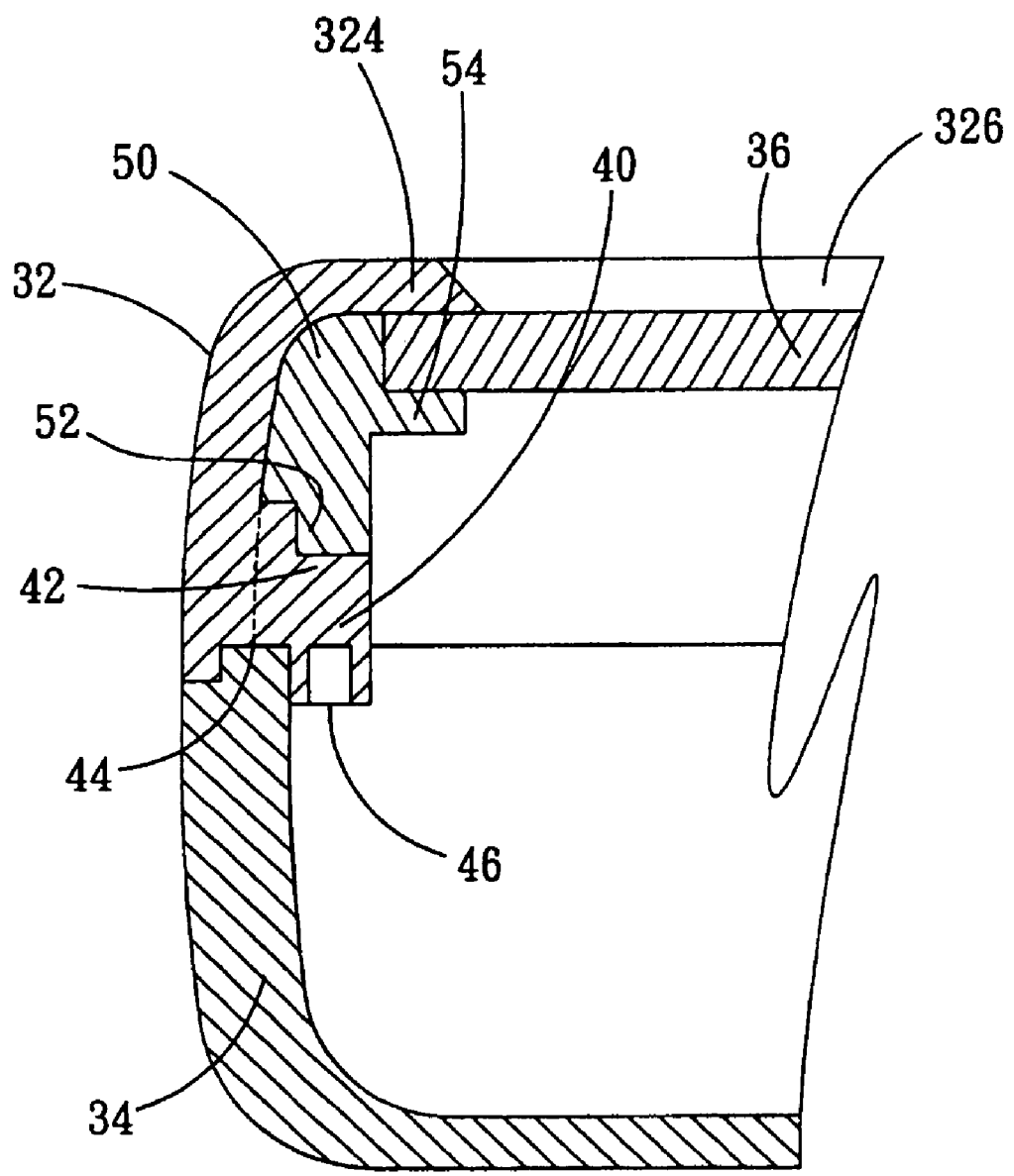
FIG. 4 is a schematic view of an embodiment of the present invention.

The glass 36 is disposed firmly on the top portion 324 of the upper housing 32 as shown in FIG. 4. Each supporting block 50 slides from one side of each base 40 to the top thereof, and in the meantime the engagement part 52 at one end of each supporting block 50 lodges in the engagement part 42 of each base 40 with the stepped structure of the engagement part 52. By doing so, each supporting block 50 is combined with each base 40.

The supporting part 54 formed on one side of each supporting block 50 is disposed under the lower surface of the glass 36. The height difference between the top surface of the supporting part 54 and the top surface of the supporting block 50 is substantially equal to the thickness of the glass 36. Therefore, the glass 36 is supported by the supporting part 54 and fixed between the supporting part 54 and the top portion 324 of the upper housing 32. That is, the glass 36 is fixed by the supporting part 54 and the top portion 324 of the upper housing 32 and placed between the supporting part 54 and the top portion 324 of the upper housing 32.

The peripheral top surface of the lower housing 34 is engaged in the engagement part 44 of each base 40. Since an opening 46 adjacent to the engagement part 44 is formed at one end of each base 40, the peripheral wall surface of the engagement part 44 may deform under pressure, facilitating the hasping of the upper housing 32 and the lower housing 34.

The present invention utilizes the mold design to form the strengthening structure on the inner wall surface of the upper housing 32, where a plurality of bases 40 is formed. A supporting block 50 is slidably installed into the top of each base 40 to support the glass 36.

Figure 5:
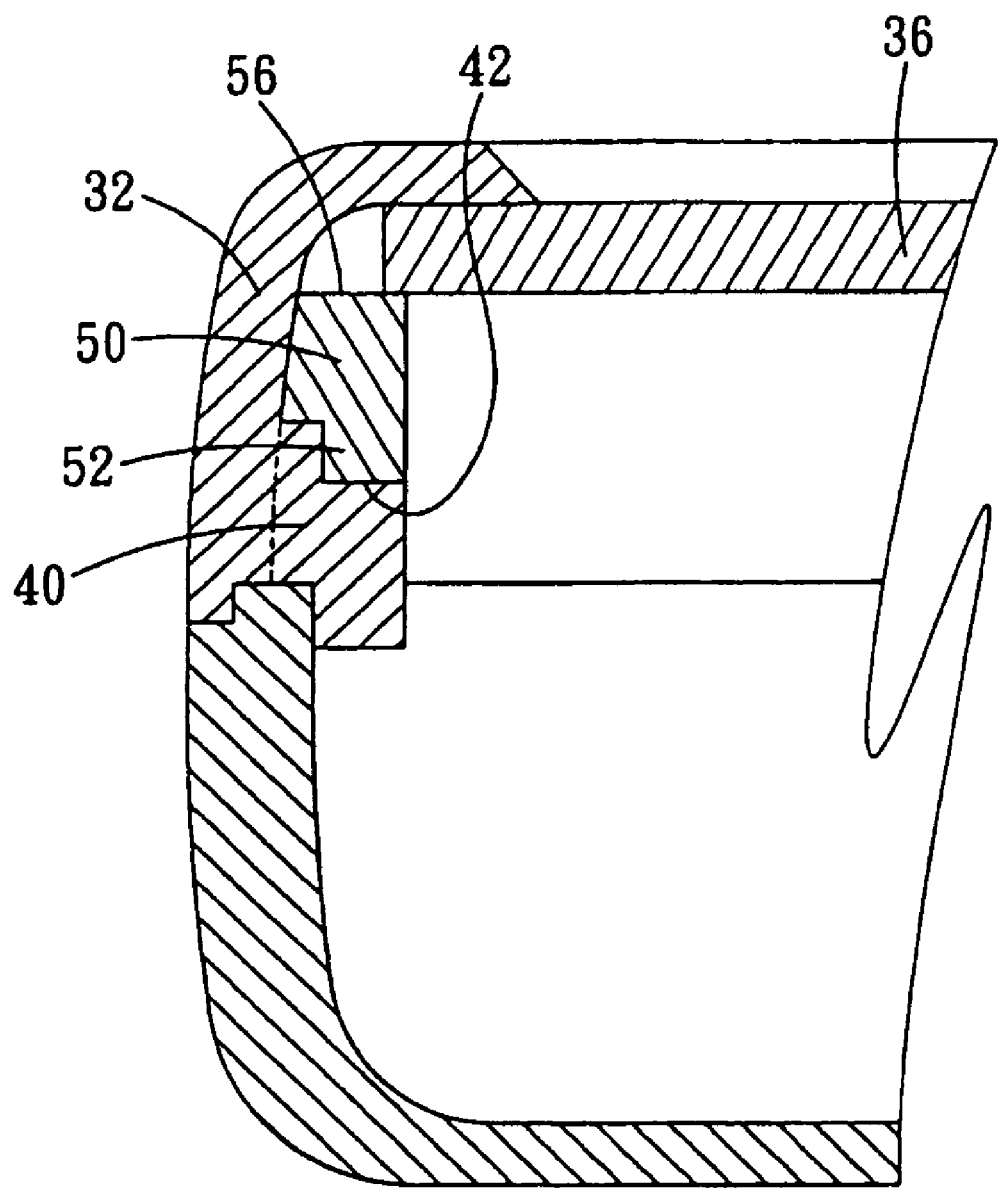
FIG. 5 is a schematic view of another embodiment of the present invention.

As shown in FIG. 5, the supporting block 50 supports the glass 36 with the top thereof. Since the glass is properly positioned, the top of the supporting block 50 is defined as a supporting part 56. An engagement part 52 is formed at one end of the supporting block 50. The engagement part 52 of the supporting block 50 and the engagement part 42 of the base 40 hasps correspondingly with respective stepped structures.

In the aforementioned embodiment, the combination of the supporting block 50 and the base 40 produces a supporting and positioning effect for the glass 36. The supporting and positioning of the glass 36 are more rigidly and effectively than the prior art due to the nearness of the combination to the glass 36. Moreover, since the supporting block 50 is an independent component and combined with the base 40, it is easier and more convenient than the prior art in fabrication and practically meets the requirements of manufacturing.

Although the present invention has been disclosed and illustrated with reference to the preferred embodiments, the principles involved can be applied for use in numerous other embodiments that will be apparent to persons skilled in the art. The present invention is, therefore, to be limited only as indicated by the scope of the appended claims.

What is claimed is:

1. A structure of a scanning window of an image scanning device, comprising:
    a housing;
    a transparent platen disposed under a top portion of said housing;
    a plurality of bases formed on inner walls of said housing; and
    a plurality of supporting blocks, each mounted on each of said bases and having a supporting part for supporting said transparent platen, wherein said transparent platen is fixed by said supporting part and said top portion of said housing and placed between said supporting part and said top portion of said housing, said supporting part extends and forms on a side of said supporting block, and a top of said supporting part and a top of said supporting block are located at different heights.

2. The structure of said scanning window of claim 1, wherein a side of said transparent platen is disposed in a gap between said top of said supporting block and said top of said supporting part.

3. The structure of said scanning window of claim 1, wherein said housing comprises an upper housing and a lower housing and said bases connect said upper housing to said lower housing.

4. The structure of said scanning window of claim 3, wherein said bases are disposed on said inner walls of said upper housing and an opening is formed at an end of each of said bases, away from a top portion of said image scanning device.

5. The structure of said scanning window of claim 1, wherein said supporting block has a stepped structure on a bottom surface of said supporting block and said base has a stepped structure on a top surface of said base, said supporting block and said base hasp correspondingly with respective stepped structures.

6. A structure of a scanning window disposed on an image scanning device, comprising:
    a housing having an upper housing and a lower housing being combined with each other;
    a transparent platen disposed under a top portion of said upper housing; and
    a plurality of bases formed on inner walls of said upper housing; and
    a plurality of supporting blocks disposed between said bases and said transparent platen,
    wherein each of said supporting blocks has a supporting part supporting said transparent platen, said supporting part is formed on a side of said supporting block, a top of said supporting part and a top of said supporting block are located at different heights, and said transparent platen is fixed between said supporting part and said top portion of said upper housing.

7. The structure of said scanning window of claim 6, wherein a side of said transparent platen is disposed in a gap between said top of said supporting block and said top of said supporting part.

8. The structure of said scanning window of claim 6, wherein said bases connect said upper housing to said lower housing.

9. The structure of said scanning window of claim 8, wherein an end of each of said bases, away from a top of said upper housing, has an opening.

10. The structure of said scanning window of claim 6, wherein said supporting block has a stepped structure on a bottom surface of said supporting block and said base has a stepped structure on a top surface of said base, said supporting block and said base hasp correspondingly with respective stepped structures.

* * * * *